United States Patent [19]

Byles

[11] Patent Number: 5,043,558

[45] Date of Patent: Aug. 27, 1991

[54] DEICING APPARATUS AND METHOD UTILIZING HEAT DISTRIBUTING MEANS CONTAINED WITHIN SURFACE CHANNELS

[75] Inventor: Joe D. Byles, Leander, Tex.

[73] Assignee: Weed Instrument Company, Inc., Round Rock, Tex.

[21] Appl. No.: 588,178

[22] Filed: Sep. 26, 1990

[51] Int. Cl.⁵ .......................... G01K 1/08; H05B 3/02
[52] U.S. Cl. .................................. 219/201; 219/530; 219/540; 73/861.68; 244/134 D
[58] Field of Search ............... 219/201, 200, 530, 540; 73/861.68; 244/134 D, 134 E; 165/185

[56] References Cited

U.S. PATENT DOCUMENTS

| | | | |
|---|---|---|---|
| 2,254,155 | 8/1941 | Reichel | 73/861.68 |
| 2,306,684 | 12/1942 | Carbonara | 73/861.68 |
| 2,482,701 | 9/1949 | Anderson | 73/861.68 |
| 2,510,986 | 6/1950 | Larkin | 73/861.68 |
| 2,590,944 | 4/1962 | Cowdrey et al. | 244/134 D |
| 2,787,694 | 4/1957 | Farries | 244/134 |
| 2,874,259 | 2/1959 | Morris | 244/134 |
| 3,116,395 | 12/1963 | Byrne et al. | 244/134 |
| 3,139,751 | 7/1964 | Rosenthal | 374/138 |
| 3,535,930 | 10/1970 | Rees | 244/134 |
| 3,621,714 | 11/1971 | Puccinelli | 374/138 |
| 3,782,452 | 1/1974 | Ceplon | 392/468 |
| 4,458,137 | 7/1984 | Kirkpatrick | 219/201 |
| 4,527,047 | 7/1985 | Seitz | 219/219 |

FOREIGN PATENT DOCUMENTS 2530937  1/1977  Fed. Rep. of Germany ...... 219/219

Primary Examiner—Bruce A. Reynolds
Assistant Examiner—John A. Jeffery
Attorney, Agent, or Firm—J. Nevin Shaffer, Jr.; Russell D. Culbertson

[57] ABSTRACT

A deicing apparatus includes a heat source for producing deicing heat at one location on the body of an object and a heat distributing arrangement for distributing the deicing heat to one or more surface areas to be deiced. The heat distributing arrangement comprises thin strips or channels of heat distributing material having a heat conductivity greater than that of the material from which the remainder of the object is formed. One end or a portion of each strip or channel of the heat distributing material is in contact with the heat source itself or in contact with a highly heat conductive potting material in which the heat source is set. Another portion of each strip or channel of heat distributing material preferably forms a portion of one of the surface areas to be deicd. The heat distributing arrangement conducts heat from the remote heat source to each surface to be deiced through the highly heat conductive heat distributing material alone and without having to extend a heating element across each separate surface to be deiced.

18 Claims, 2 Drawing Sheets

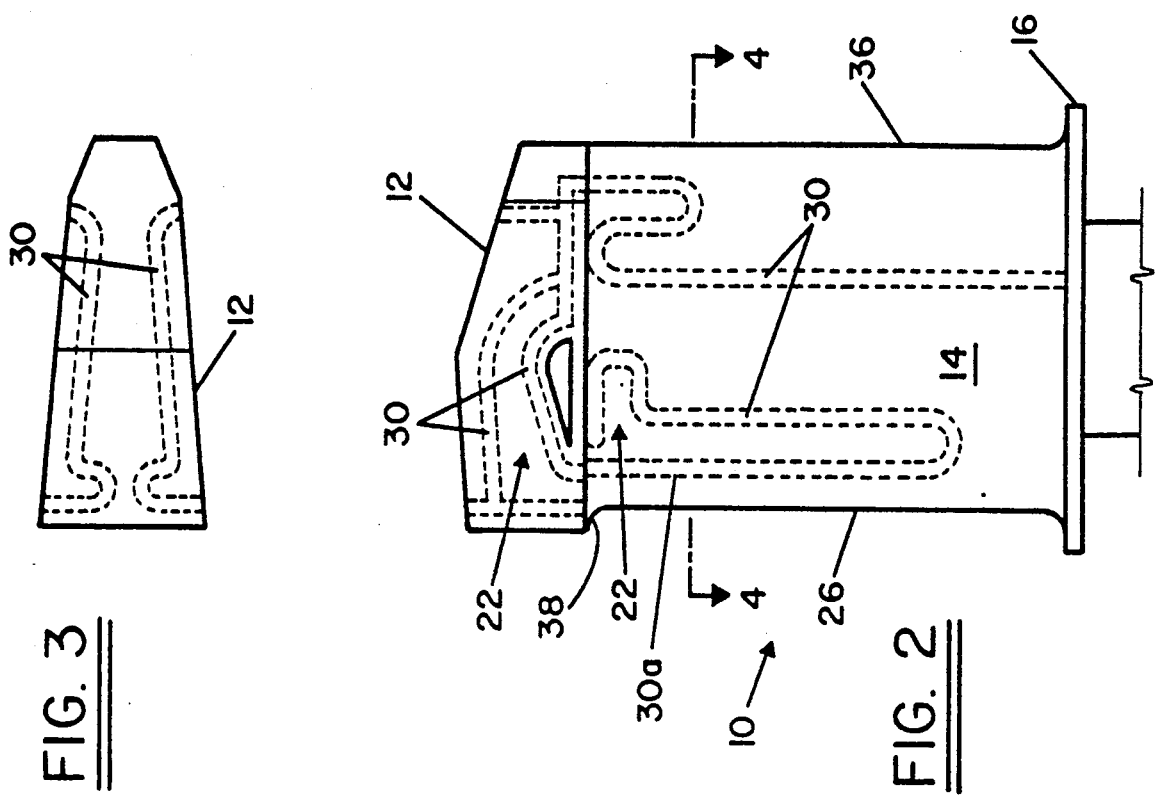
FIG. 3
FIG. 2
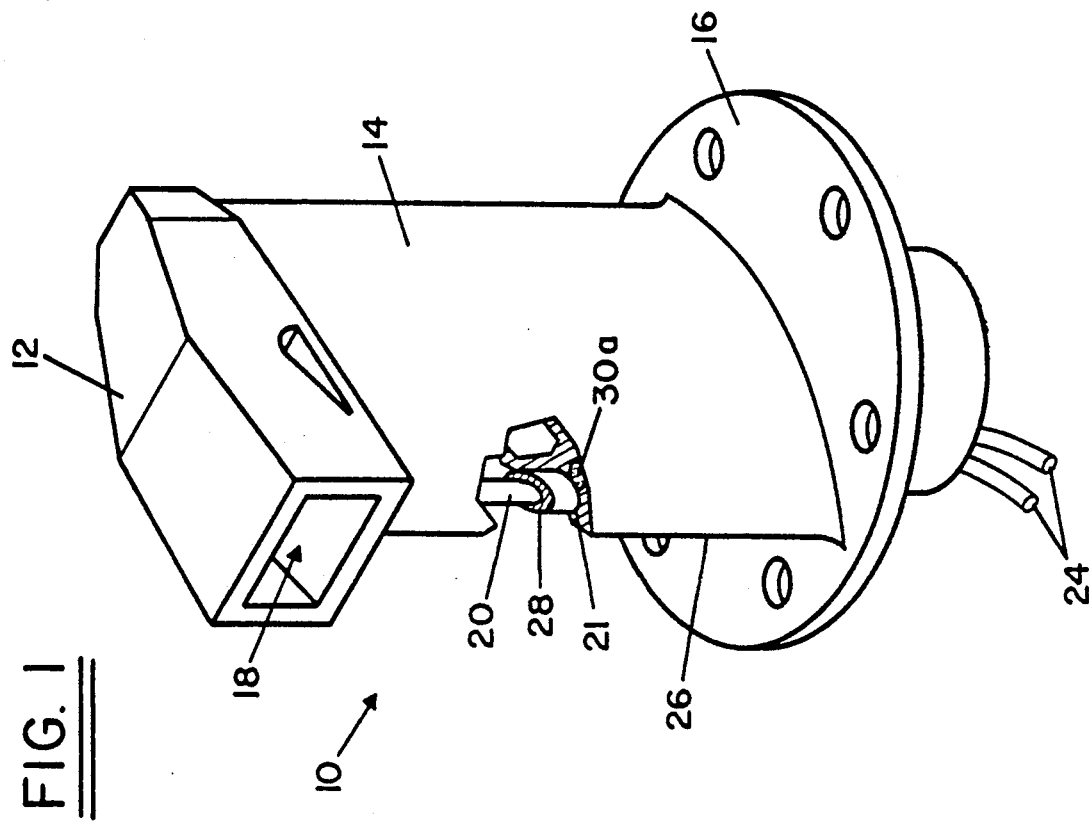
FIG. 1

DEICING APPARATUS AND METHOD UTILIZING HEAT DISTRIBUTING MEANS CONTAINED WITHIN SURFACE CHANNELS

BACKGROUND OF THE INVENTION

This invention relates to deicing devices and methods, and particularly, to deicing devices and methods employed in aerodynamic bodies or components.

Aircraft are commonly subjected to operating conditions in which ice may accumulate on certain surfaces. Accumulated ice may interfere with performance of some surfaces, and, in the case of some aircraft components, may completely block proper operation.

Examples of aircraft components that are adversely affected by even small accumulations of ice include pitot tubes and total temperature probes. Total temperature probes, for example, commonly include an aerodynamically shaped probe housing with an inlet scoop mounted at one end and a temperature sensor element mounted within the housing. The inlet scoop also includes an arrangement for stagnating airflow around the sensor element so that the sensor element may obtain the desired temperature reading. When the housing of the total temperature sensor probe is subjected to icing conditions, ice may form not only on the outer portion of the housing but also in and around the inlet scoop and on the airflow stagnating surfaces. The accumulation of ice alters the airflow around the airflow stagnating surfaces and prevents the surfaces from performing their intended function. This causes erroneous temperature readings by the sensor. Also, ice destroys the desired aerodynamic properties of the remainder of the probe and increases overall weight.

Prior deicing devices for deicing pitot tubes, total temperature probes, and other aerodynamic components included an electrical resistive cable-type heater mounted within the component body and extending in a complex serpentine pattern across every area on the component body in which deicing was desired. The particular component was first cast or otherwise formed with a complex serpentine channel extending across the areas to be deiced, and then the heater element was mounted in the channel. The cable-type heater had to be bent into the desired complex shape, staked or tacked down in the channel, and then the channel had to be filled with a heat conductive braze. Excess braze was finally machined or ground away to complete the desired aerodynamic shape.

Although this cable-type heater deicing arrangement was common in the industry for many years, there were a number of problems associated with such deicing arrangements. First, the time required to carefully bend the heating element, stake it in place, braze it in, and then grind the component, was excessive, easily accounting for 70% of total production time. Thus, the prior deicing arrangement was very expensive in terms of labor cost. Also, the production process resulted in many defective products since the cables were susceptible to damage in the bending and staking process, and were particularly susceptible to damage by the heat to which they were subjected in the brazing process. Even if the cable-type heater survived the bending, staking, and heating, a mistake in the braze grinding process could damage the heater element. In addition to high cost and low yield resulting from the required production process, the heater life in the surface cable-heater deicing arrangement was low due to the poor heat conduction path from the heating element through the electrical insulating material required to electrically isolate the thin elongated heater element from the component body.

SUMMARY OF THE INVENTION

It is an object of the invention to provide a deicing apparatus and method that overcomes the above-mentioned problems and others associated with prior deicing devices and methods.

In furtherance of this object, the deicing apparatus according to the invention is adapted for distributing deicing heat to various surface areas of an object without extending a heat generating element to each area. The apparatus includes heating means for producing deicing heat at one point within the object body and heat distributing means comprising strips or channels of a high heat conductivity heat distributing material. The strips or channels of heat distributing material conduct heat produced by the heating means to the various surface areas of the object in which deicing is desired.

Although the apparatus according to the invention may be incorporated in a variety of different objects that may be subjected to icing conditions in operation, the apparatus finds particular application in aerodynamic bodies or components such as pitot tubes and total temperature probes used in the aerospace industry. For example, the apparatus of the invention may be incorporated in a total temperature probe comprised of an aerodynamic housing, an inlet scoop having aerodynamic components mounted inside, and a temperature sensor probe mounted within the housing.

The preferred heating means or heat source for use with the total temperature probe comprises an cartridge-type electrical resistive heater mounted within a heater cavity extending through the leading edge of the probe housing or body. This preferred heating means is inexpensive, durable, and is easily mounted or fixed within the heater cavity. Alternative types of heaters or heating means may include a heat exchange tube mounted within the total temperature probe housing and adapted to receive engine discharge bleed air, or any other suitable heat source. Regardless of the heating means employed, the heating means may be mounted within the component itself or may be mounted remotely from the particular component on which deicing is desired. In this latter case, the heat source is thermally connected to the component through the heat distributing means.

The preferred heat distributing means for use in the total temperature probe includes not only the strips or channels of heat distributing material but also a potting material in which the heater is mounted in the heater cavity. Both the heat distributing material used for the channels or strips and the heater potting material are highly heat conductive and have a heat conductivity at least greater than the material from which the probe housing and inlet scoop are formed. Also, in the form of the invention incorporated in the total temperature probe, the probe housing, air inlet scoop, and inner aerodynamic surfaces each include shallow surface channels or grooves in the material from which the component is formed and the heat distributing strips or channels are formed by filling the component surface channels with the heat distributing material. Each surface area to be deiced includes at least some heat distributing material connected to the heat source through one or more channels or strips of the same material or another suitable highly heat conductive material. Although the channels formed in the component body to be filled with the heat distributing material are preferably surface channels or grooves, in some cases the channels may extend under the surface of the component for a portion of their length, and then terminate as surface channels or grooves in an area to be deiced.

The method of deicing according to the invention includes producing deicing heat at the heating means or heat source and then distributing the deicing heat from the heat source through the strips or channels of heat distributing material to at least a portion of each surface area to be deiced. Since the heat distributing material has a heat conductivity greater than that of the object or component body and since each channel or strip of material is in good thermal contact with the heat source, the channels or strips readily conduct heat to the various surfaces to perform the desired deicing function. In the preferred form of the invention the heat source 20 comprises the cartridge-type electrical resistive heater potted within the heater cavity and the step of distributing heat from the heat source includes conducting heat through the potting material to the heat distributing material in the channels.

The preferred method of producing an object having the deicing apparatus according to the invention avoids subjecting the heater to brazing heat. According to this method of manufacture, the object body is first cast or otherwise formed with the channels or grooves, and then the channels are filled with heat distributing material. The heat distributing material is then machined to produce the desired contours on the object before the heater is mounted in the object body with the refractory potting material. Thus, the heater is not only spared the brazing heat but is also protected from potential damage from the braze machining process.

These and other objects, advantages, and features of the invention will be apparent from the following description of the preferred embodiments, considered along with the accompanying drawings.

DESCRIPTION OF THE DRAWINGS

FIG. 1 is a view in perspective of a total temperature probe having a deicing apparatus embodying the principles of the invention incorporated therein, the figure partially broken away to show the heat source.

FIG. 2 is a right side view in elevation of the total temperature probe shown in FIG. 1, with the channels of heat distributing material shown in phantom.

FIG. 3 is top plan view of the total temperature probe shown in FIG. 1 with the channels of heat distributing material shown in phantom.

DESCRIPTION OF THE PREFERRED EMBODIMENTS

Figure 5:
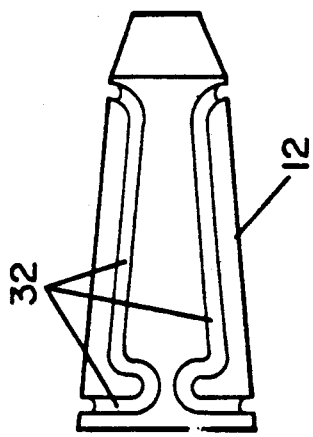
FIG. 5 is a top plan view similar to FIG. 3 but with the heat distributing material removed from the channels.

FIGS. 1-4 show a total temperature probe 10 incorporating a deicing apparatus embodying the principles of the invention. Although a total temperature probe is shown to illustrate the invention, the deicing apparatus according to the invention could be incorporated in other types of aerodynamic components such as pitot tubes. Those skilled in the art will recognize many other deicing applications for the apparatus and method of the invention.

The total temperature probe 10 includes an inlet scoop or cap 12 and an aerodynamic strut or probe housing 14 connected to a suitable mounting flange 16. The inlet scoop 12 includes an internal aerodynamic surface arrangement, shown generally at reference numeral 18, adapted to stagnate the airflow adjacent to a temperature sensor (not shown) mounted in the probe housing 14. Various airflow stagnating arrangements and temperature sensors are well known in the aircraft sensor art.

The deicing apparatus according to the invention includes heating means, in this case comprising a heat source or heating element 20 mounted within the probe housing 14, and heat distributing means shown generally in FIG. 2 at reference numeral 22. The heat source 20 preferably comprises a cartridge-type electrical resistive heater. Although the detail of the heat source 20 is not shown in the drawings, the preferred cartridge-type heater comprises a suitable electrical resistive wire wound on a cylindrical mandrel and encased in a suitable electrical insulating material which also exhibits good heat conductivity. Leads 24 to the resistive wire are exposed below the mounting flange 16 for connection to a suitable current source. Such cartridge-type heaters are preferred for the total temperature probe application of the invention for their low cost, long life, and for the convenient lead positioning at the bottom of the probe. However, alternate heat sources or heating means may be employed to provide the deicing heat according to the invention. For example, one alternate heat source comprises a heat exchange tube (not shown) extending through the probe housing and adapted to receive engine discharge bleed air.

Figure 4:
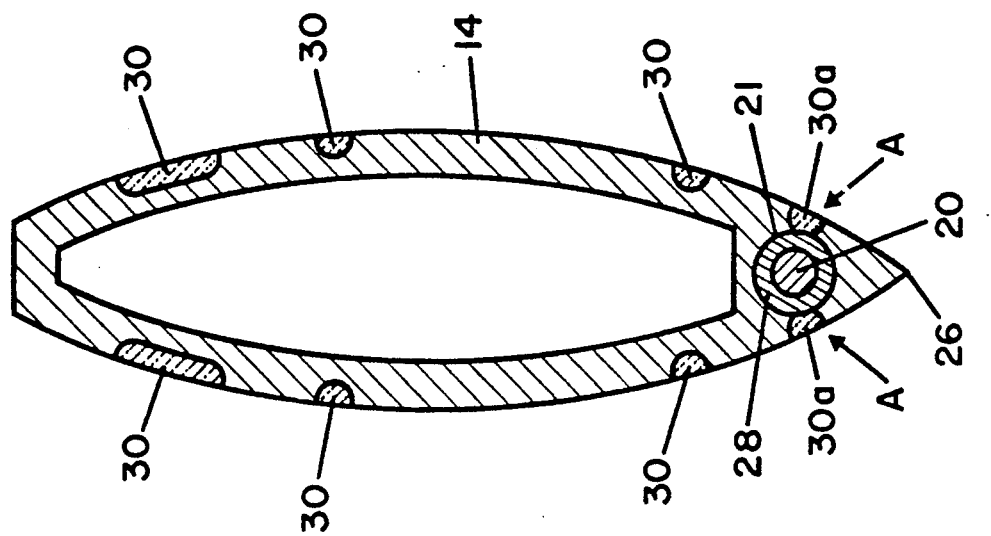
FIG. 4 is a view in transverse section taken along line 4—4 in FIG. 2.

As shown best in FIG. 4, the heat source 20 is positioned within the component beneath a first surface A which is the nearest outer surface of the component. Preferably, the heat source 20 is mounted within the probe strut or housing 14 in a heater cavity 21 formed in an area near the leading edge 26 of the aerodynamic body. This leading edge positioning for the heat source is preferred for several reasons. First, icing is most acute in surface areas adjacent to the leading edge of the aerodynamic body, in this case the leading edge 26 of the probe strut or housing 14. Also, the leading edge 26 usually forms one of the thickest areas of material in small aerodynamic components and can accommodate the particular heat source without making the component too fragile. However, the heat source according to the invention may be positioned elsewhere on or within the particular body or component having surface areas to be deiced. Furthermore, the heat source may be positioned completely off of or remote from the particular body or component to be deiced and the heat distributing means may be employed to distribute heat not only to the areas on the body to be deiced but also from the remote heat source to the body or component.

The heat distributing means 22 in the illustrated form of the invention comprises a potting material 28 in which the heater 20 is potted within the heater cavity 21; and channels or strips of heat distributing material 30 extending from the potting material to several different surface areas to be deiced. In this form of the invention, the channels of heat distributing material 30 comprise surface grooves or channels 32 formed in the component body (shown best in FIGS. 5 and 6) and filled with the heat distributing material. The heat distributing channel material 30 as well as the potting material 28 each have a heat conductivity greater than that of the material in which they are set, in this case, the material from which the remainder of the total temperature probe 10 is cast or otherwise formed.

The pattern of heat distributing material 30 shown in FIGS. 2-4 is symmetrical on either side of the probe 10 although symmetry is not required according to the invention. The illustrated pattern includes a forward channel of material 30(a) near the leading edge 26 and in continuous contact with the potting material 28 along substantially the entire length of the probe housing or strut 14. The remainder of the heat distributing channels or strip 30 extends continuously across portions of the inlet scoop 12 near its leading edge, along the sides, and across the top, and then back down the strut 14 near its trailing edge 36. Also, heat distributing material may be located in areas other than the channels or grooves 32 and may be used to build up or form a desired contour on a portion of the component such as at the connection 38 between the inlet scoop 12 and the strut 14 shown best in FIG. 2. Also, although the channels of heat distributing material 30 shown in the figures extend along the surface of the probe body along their entire length, those skilled in the art will readily appreciate that the heat distributing material channels may extend under the surface of the component along a portion of their length and then surface only in the particular areas where deicing is desired.

To produce the total temperature probe 10 incorporating the deicing apparatus according to the invention, the bulk of the strut 14 and inlet scoop or cap 12 are first cast or otherwise formed from a desirable material such as a beryllium copper alloy. As FIGS. 5 and 6 indicate, the component at this point includes the general form desired but with the open channels or grooves 32 formed across the surface areas in which deicing is desired. A portion of the channels also extends through a solid area in the housing in which the heater cavity 21 is to be formed. In the preferred form of the invention the strut 14 and the inlet scoop 12 are cast in separate pieces and the scoop itself is cast in a separate base and top piece.

Figure 6:
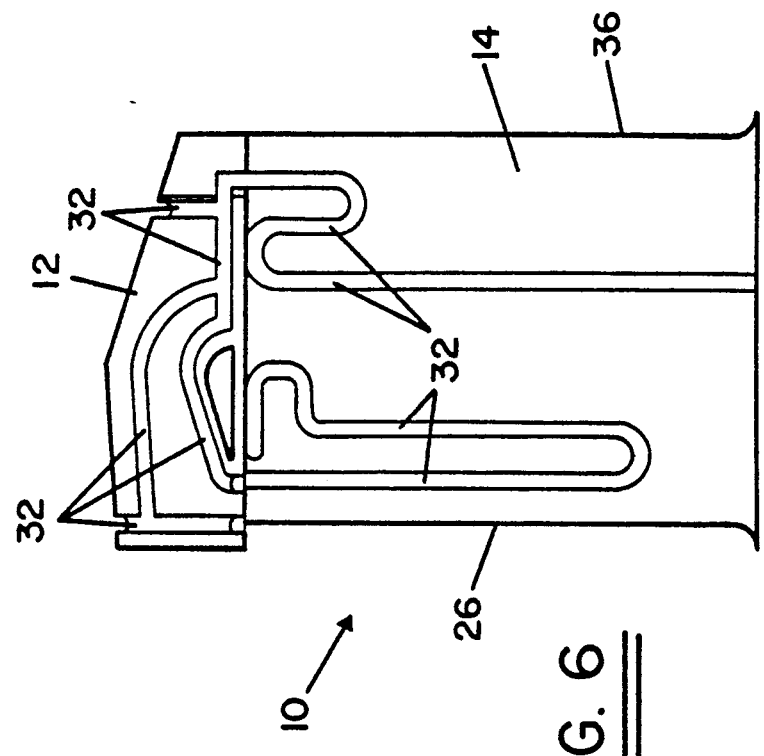
FIG. 6 is a right side view in elevation similar to FIG. 2 but with the heat distributing material removed from the channels.

With the body of the particular component formed and connected together such as the total temperature probe shown in FIGS. 5 and 6, the surface grooves or channels 32 are filled with a suitable heat conductive braze such as a silver alloy braze. In addition to filling the grooves or channels 32, the braze may be used to build up and contour portions of the components such as the connection 38 between the inlet scoop and the strut (FIG. 2). Also, where the component is cast in several pieces, the braze may be used to connect the pieces into the desired form.

After the braze is applied, any excess braze material is ground away to form the desired surface contours as shown in FIGS. 1 and 4. With all of the heat distributing strips of braze 30 in place, the heater cavity 21 is preferably drilled through the strut 14 and then the heater 20 is potted in the cavity in the desired potting material 28. As shown particularly in FIG. 4 the perimeter of the heater cavity 21 intersects and overlaps with a portion of the heat distributing material channels 30(a) that extend along the strut 14 near its leading edge 26. This results in a good heat conduction path from the particular heat source 20 to the heat distributing material 30(a) through the potting material 28.

Referring now particularly to FIGS. 1-4, the operation of the deicing apparatus and the method of the invention includes first producing deicing heat at one point, in this case beneath surface area A in the probe housing or strut 14 near the leading edge 26, and then distributing or conducting the deicing heat to various surface areas to be deiced on the probe 10 through the heat distributing material channels or strips 30. In the illustrated form of the invention the heat distributing means 22 also includes the heat distributing potting material 28 within which the heat source 20 is set, and the method of the invention also includes conducting the deicing heat from the heat source 20 to the heat distributing material channels 30 through the potting material. Since the heat distributing material 30 in the illustrated form of the invention are surface channels along their entire length, the step of distributing or conducting heat to the surface areas to be deiced includes conducting heat along the surface of the body to the surface areas to be deiced. As discussed above, in some forms of the invention, the step of conducting heat from the heat source 20 to the surface areas to be deiced may include conducting heat along subsurface channels of heat distributing material along at least a portion of the distance.

The above described preferred embodiments are intended to illustrate the principles of the invention, but not to limit the scope of the invention. Various other embodiments and modifications to these preferred embodiments may be made by those skilled in the art without departing from the scope of the following claims. For example, many different patterns for the heat distributing material may be employed depending on the areas in which deicing is desired. In some cases, the leading edge of an aerodynamic body may include heat distributing material. In other cases, placing the heat distributing material in areas adjacent to the leading edge will suffice.

I claim:

1. A deicing apparatus for objects that include a body of material having a surface area that may be subjected to icing conditions, the deicing apparatus comprising:
   (a) heating means for producing deicing heat at an area beneath a first surface area of the object; and
   (b) heat distributing means in contact with the heating means and extending away from the first surface area of the object to a deicing area on the outer surface of the body of material so as to form a portion of the object outer surface in the deicing area, the heat distributing means for conducting the deicing heat produced by the heating means to the deicing area and comprising a heat distributing material having a heat conductivity greater than that of the material comprising the body of material, a portion of the heat distributing material being deposited on the body of material in the deicing area.

2. The apparatus of claim 1 wherein the object includes a channel formed in the body thereof extending generally across the surface of the object in the deicing area, and wherein the heat distributing material includes a heat distributing channel material that substantially fills the channel formed on the object.

3. The apparatus of claim 2 wherein the channel extends along the surface of the object along the entire channel length.

4. The apparatus of claim 1 wherein:
(a) the object includes a heater cavity formed beneath the first surface area thereof;
(b) the heating means includes a heating element mounted within the heater cavity; and
(c) the heat distributing means includes a heat distributing potting material in which the heating element is received in the heater cavity.

5. The apparatus of claim 4 wherein the object includes a plurality of channels formed therein, each channel extending from the cavity to a different deicing surface of the object and wherein the heat distributing material includes a heat distributing channel material that substantially fills each channel formed on the object.

6. The apparatus of claim 5 wherein the heat distributing channel material and the heat distributing potting material are different materials.

7. The apparatus of claim 6 wherein:
(a) the heat distributing channel material comprises a silver alloy braze;
(b) the heat distributing potting material comprises a high thermal conductivity refractory material; and
(c) the heating element comprises a cartridge-type electrical resistive heater.

8. An aerodynamic component adapted to operate in icing conditions comprising:
(a) a component body having a leading edge, said component body including a plurality of channels, each channel extending from the heat source cavity to a different deicing area on the component body and across the surface of the component body in the respective deicing area;
(b) a heat source capable of supplying deicing heat, the heat source being mounted within the component body in a heat source cavity beneath a first surface area of the body; and
(c) heat distributing means in contact with the heat source and extending away from the first surface area of the body to a deicing area on the outer surface of the body where deicing is desired and forming a portion of the outer surface of the component in the deicing area, the heat distributing means for conducting the deicing heat supplied by the heat source to the deicing area and comprising a heat distributing material which includes a channel material positioned in the channel, said heat distributing material having a heat conductivity greater than that of the material from which the remainder of the component body outer surface is formed.

9. The component of claim 8 wherein:
(a) the component body includes at least one channel extending from the heat source cavity to the deicing area and across the surface of the component body in the deicing area; and
(b) the heat distributing material includes a channel material positioned in the channel.

10. The component of claim 9 wherein the channel extends along the surface of the component body substantially the entire length of the channel.

11. The component of claim 9 wherein the heat distributing means includes:
(a) a potting material in which the heat source is received in the heat source cavity.

12. The component of claim 11 wherein the potting material is a refractory material and the channel material is a suitable heat conductive braze.

13. The component of claim 12 wherein the heat source is a cartridge-type electrical resistive heater.

14. A method for deicing a surface on a body of material, the method comprising the steps of:
(a) producing deicing heat at a first location beneath a first surface area of the body; and
(b) distributing the deicing heat to at least one surface area on the body other than the first surface area through a heat distributing material extending from the first location to said surface area on the body other than the first surface area, the heat distributing material forming a portion of the body outer surface in said surface area and having a heat conductivity greater than that of the material from which the remainder of the body outer surface is formed wherein the step of distributing deicing heat to the surface ar oe deiced includes conducting heat along a sur . ⁻ channel formed in the body of material entirely filled with the heat distributing material.

15. The method of claim 14 including the step of:
(a) distributing the deicing heat to least a portion of the first surface area.

16. The method of claim 15 wherein the channel extends along the surface of the body along substantially the entire channel length.

17. A method of making an aerodynamic component adapted to operate in icing conditions, the method comprising the steps of:
(a) forming a body of the component with a solid heat source receiving area and at least one channel having a channel portion extending through the heat source receiving area;
(b) filling each channel with a heat distributing metal having a heat conductivity greater than the material from which the body of the component is formed;
(c) forming a heat source cavity in the heat source receiving area, the heat source cavity extending through a portion of the heat distributing metal in the channel portion that extends through the heat source receiving area; and
(d) potting a heat source in the heat source cavity with a refractory material having a heat conductivity greater than the material from which the component body is formed.

18. The method of claim 19 including the steps of:
(a) adding heat distributing metal to the surface of the component body to be contoured; and
(b) machining the added heat distributing metal and any excess heat distributing metal around the channel to form the desired component body contours before the step of potting the heat source.

* * * * *

UNITED STATES PATENT AND TRADEMARK OFFICE
CERTIFICATE OF CORRECTION

PATENT NO. : 5,043,558
DATED : August 27, 1991
INVENTOR(S) : Joe D. Byles It is certified that error appears in the above-identified patent and that said Letters Patent is hereby corrected as shown below:

In Claim 18, column 8, line 54 of the Patent, change "19" to --17--.

Signed and Sealed this

Twenty-third Day of March, 1993

Attest:

STEPHEN G. KUNIN

*Attesting Officer*        Acting Commissioner of Patents and Trademarks